[redacted] [redacted]

[11] 3,576,946

[72] Inventor Kenneth Frizane
Elmwood Park, Ill.
[21] Appl. No. 788,858
[22] Filed Jan. 3, 1969
[45] Patented May 4, 1971
[73] Assignee Zenith Radio Corporation
Chicago, Ill.

[54] POWER SUPPLY PROTECTION CIRCUIT UTILIZING A SILICON CONTROLLED RECTIFIER

4 Claims, 1 Drawing Fig.

[52] U.S. Cl. .......... 178/7.3
[51] Int. Cl. .......... H04n 5/44
[50] Field of Search .......... 178/7.3 (E), 7.5 (E); 317/31, 22, 23, 51, 33, 52; 315/127

[56] References Cited
UNITED STATES PATENTS
3,270,128 8/1966 Stark .......... 178/7.5
3,325,684 6/1967 Berger .......... 317/23

*Primary Examiner*—Richard Murray
*Assistant Examiner*—John C. Martin
*Attorneys*—John J. Pederson and Eugene M. Cummings

ABSTRACT: A control circuit for preventing the application of accelerating potential in excess of a predetermined maximum value to the cathode-ray picture tube of a television receiver. Positive polarity pulses amplitude-related to the applied accelerating potential are derived from the receiver horizontal deflection system and impressed across the emitter-base junction of a transistor. The base of this transistor is biased at a DC level such that the impressed pulses will exceed the breakdown potential of the junction when the accelerating potential exceeds its maximum value. When this occurs a control voltage is applied by the transistor to the control electrode of a silicon controlled rectifier (SCR) which has principal electrodes connected between the screen of the horizontal deflection system output tube and ground. This causes the SCR to conduct, substantially reducing the screen current applied to the output tube and hence the energy available for powering the receiver's sweep-excited high voltage power supply, and preventing further generation of excessive accelerating potential. To prevent the receiver from being rendered inoperative by a transient overload condition, a capacitor couples pulses from the output circuit of the receiver vertical deflection system to the screen of the horizontal output tube to periodically reduce the quiescent current through the principal electrodes following an overvoltage condition to a value below the minimum holding current required to sustain conduction, thereby restoring the SCR to a nonconductive state and the high voltage power supply to an operative state. During a sustained overvoltage condition the control circuit causes the receiver to alternate between operative and nonoperative states, which "blinking" action on the receiver viewing screen effectively indicates a malfunction.

PATENTED MAY 4 1971 3,576,946
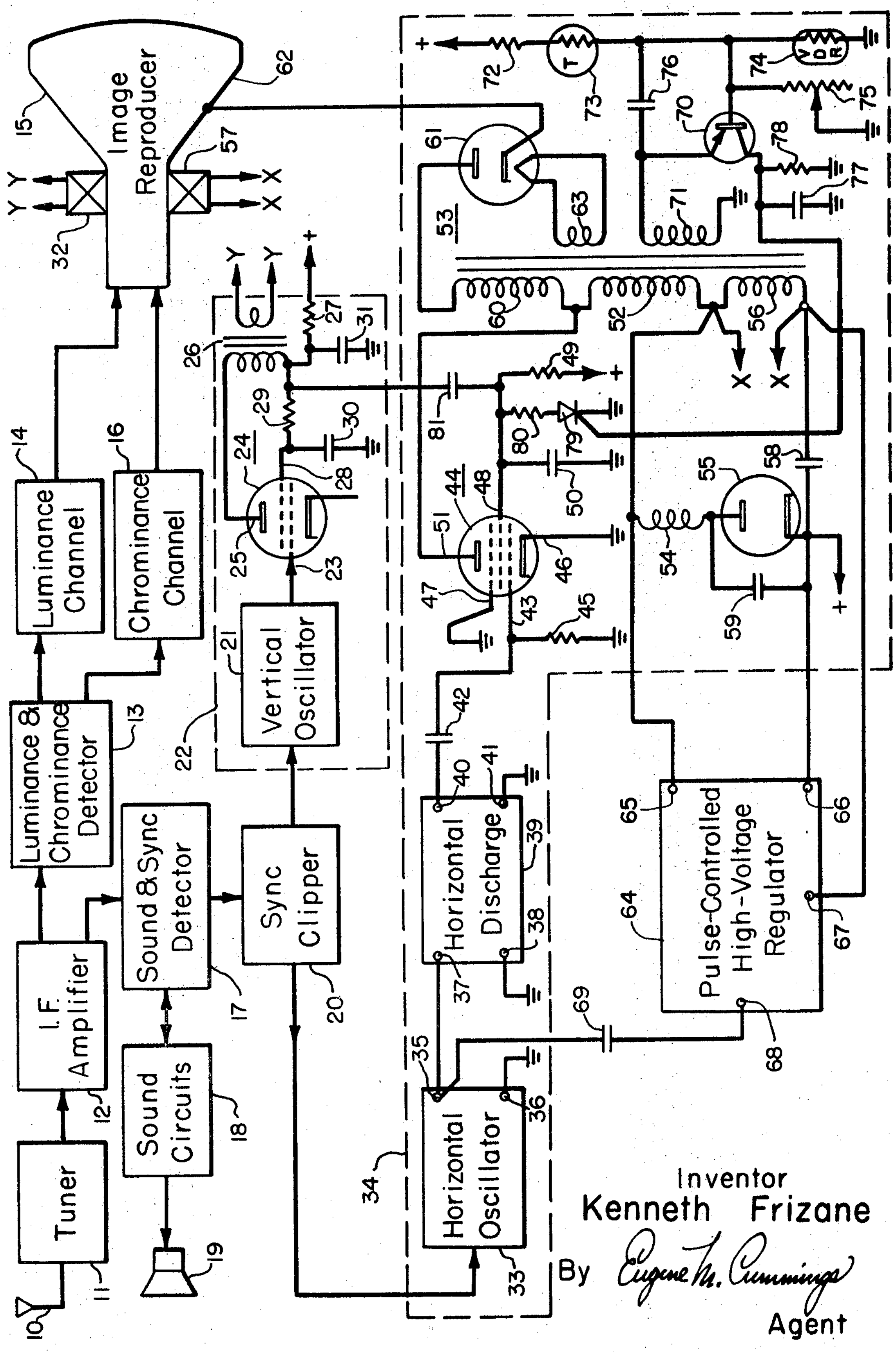
Inventor
Kenneth Frizane
By Eugene M. Cummings
Agent

POWER SUPPLY PROTECTION CIRCUIT UTILIZING A SILICON CONTROLLED RECTIFIER

BACKGROUND OF THE INVENTION

The present invention relates to improvements in television receiver control circuits, and more particularly, to an improved control circuit for limiting the high voltage produced by the sweep-excited power supply of a color television receiver.

Cathode-ray tubes of the type commonly used for image reproduction in present-day color television receivers require for their operation an accelerating potential in the order of 25,000 volts. For reasons of economy, it has become standard practice to generate this potential by means of a power supply excited by the output stage of the receiver horizontal deflection system. Unfortunately, such sweep-excited power supplies, while offering economy by obviating the need for expensive transformers and filters, have undesirably poor voltage regulation under the varying load conditions imposed by cathode-ray tubes with brightness level variations in the reproduced image. Accordingly, it has become standard practice to use in conjunction with such power supplies a voltage regulator for maintaining the accelerating potential substantially constant in the face of brightness variations. Such regulators have generally fallen into one of two categories; the shunt-connected type which is connected across the high-voltage output of the power supply to maintain a substantially constant load on this supply at all times, and the pulsed type which is gated into conduction during a portion of the horizontal retrace interval to impose a variable load on a low voltage secondary winding on the flyback transformer.

Unfortunately, the use of either of these two types of regulators is accompanied by the possibility that the regulator will fail and the high voltage produced by the power supply will rise to abnormally high levels, limited only by the capability of the power supply components. Should this happen, there exists the possibility of damage to the power supply components as well as the possibility of the picture tube and other electron discharge devices in the circuit becoming a shock and radiation hazard.

SUMMARY OF THE INVENTION

Accordingly, it is a general object of the invention to provide an improved control circuit for limiting the accelerating potential produced by the sweep-excited high voltage power supply of a television receiver to a predetermined maximum value.

It is a more specific object of the invention to provide a control circuit for limiting the accelerating potential produced by the sweep-excited high voltage power supply of a television receiver which automatically resets itself following an overvoltage condition.

In accordance with the invention, in a television receiver of the type including an image reproducer requiring an externally applied high voltage accelerating potential, and a high voltage power supply for supplying the potential, a control circuit for preventing the accelerating potential from exceeding a predetermined maximum value comprises means, including an overvoltage detector, for producing a control voltage in response to the accelerating potential exceeding the predetermined maximum value. Bistable means, actuable by the control voltage from a normal ineffective state to an effective state and remaining therein until restored, are included to regulate or interrupt the power supply, and means are further included for periodically restoring the control means to the ineffective state.

BRIEF DESCRIPTION OF THE DRAWINGS

The features of the present invention which are believed to be novel are set forth with particularity in the appended claims. The invention, together with further objects and advantages thereof, may be understood by reference to the following description taken in conjunction with the accompanying drawing which is a detailed diagram, partially in block form and partially in schematic form, of a color television receiver incorporating an improved high voltage limiting control circuit in accordance with the invention.

DESCRIPTION OF THE PREFERRED EMBODIMENT

With the exception of certain detailed circuitry in its horizontal deflection system, the illustrated receiver is essentially conventional in design and accordingly only a brief description of its structure Nd operation need be given here. A received signal is intercepted by an antenna 10 and coupled in a conventional manner to a tuner 11, which includes the usual radio frequency amplifying and heterodyning stages for translating the signal to an intermediate frequency. After amplification by an intermediate frequency (IF) amplifier 12 the signal is applied to a luminance and chrominance detector 13, wherein luminance and chrominance information in the form of a composite video signal is derived.

The luminance component of the composite signal, representing elemental brightness variations in the televised image, is amplified in a luminance channel 14 and applied to the receiver image reproducer 15, a conventional trigun, tricolor cathode-ray tube. The chrominance component of the composite signal, representing elemental color hue and saturation variations, is coupled from detector 13 to a chrominance channel 16, which includes conventional chrominance amplification and demodulation circuitry for deriving color control signal representative of the chrominance content of the transmitted image. These signals are applied to image reproducer 15 wherein they matrix with the amplified luminance signal from channel 14 to produce an image having brightness, hue and color saturation characteristics corresponding to those of the transmitted image.

The amplified intermediate-frequency signal from intermediate frequency signal from intermediate frequency amplifier 12 is also applied to a sound and sync detector 17, wherein a composite video-frequency signal is derived which includes both sound and synchronizing components. The sound components of this composite signal are applied to sound circuits 18, wherein conventional sound demodulation and amplification circuitry is utilized to develop an audio output signal for application to a speaker 19. The synchronizing components are applied to a sync clipper 20, wherein synchronizing information, in the form of horizontal and vertical sync pulses, is separated for application to the receiver deflection circuits.

The vertical sync pulses are applied to a vertical oscillator 21, part of the receiver vertical deflection system 22, wherein they are utilized to generate a synchronized vertical-rate drive signal for application to the control grid 23 of a vertical deflection amplifier tetrode 24. The anode 25 of electrode 24 receives operating power from the receiver B+ supply through a load circuit serially comprising the primary winding of a vertical output transformer 26 and an isolation resistor 27. The screen grid 28 of this tube is supplied through resistor 27 and a series-connected screen dropping resistor 29, and bypassed to ground at signal frequencies by a capacitor 30. A capacitor 31 is connected between the juncture of resistors 27 and 29 and ground to provide isolation and filtering.

The secondary winding of transformer 26 is connected to a vertical deflection winding 32 associated with image reproducer 15, and the nature of the drive signal applied to tetrode 24 is such that a sawtooth current is generated in this winding in synchronism with the received signal. The additional wave-shaping and feedback circuitry which would ordinarily be included in a practical vertical output stage has been omitted for purposes of clarity, inasmuch as it has no effect on the functioning of the invention.

The horizontal sync pulses from sync clipper 20 are applied to a horizontal oscillator 33, which comprises part of the receiver horizontal deflection system 34 and includes appropriate phase-detector and reactance control circuitry for producing at its output terminals 35 and 36 a synchronized horizontal-rate sine-wave output signal.

The oscillator output signal is applied directly to the input terminals 37 and 38 of a horizontal discharge stage 39, terminals 35 and 37 being connected together and terminals 36 and 38 being grounded. Horizontal discharge stage 39 amplifies and conditions this signal to develop a drive signal across its output terminals 40 and 41 which resembles a sawtooth during scan intervals and a steep negative-polarity pulse during retrace intervals. Terminal 41 is grounded and the drive signal is coupled by a capacitor 42 from terminal 40 to the control grid 43 of an electron-discharge device, pentode 44. The control grid of pentode 44 is returned to ground by a resistor 45, the cathode 46 and suppressor grid 47 are grounded, and the screen grid 48 is connected to B+ by a series dropping resistor 49 and bypassed to ground at signal frequencies by a capacitor 50. The anode 51 is coupled to B+ through a load circuit serially comprising the primary winding 52 of a conventional horizontal flyback transformer 53, and inductor 54 and a damper diode 55.

A sawtooth deflection signal is derived from deflection system 34 by means of a secondary winding 56, across which a horizontal deflection winding 57 associated with image reproducer 15 is connected and across which diode 55 is effectively shunt-connected by inductor 54 and a capacitor 58, which capacitor also serves in a manner well known to the art to develop "boosted B+" voltage at its juncture with winding 56 for those receiver circuits requiring a supply voltage in excess of B+. A storage capacitor 59 shunt-connected across diode 55 also suppresses radio frequency spurious emissions generated therein.

In its general aspects, the operation of horizontal deflection system 34 is well known to the art. The drive signal applied to the control grid of pentode 44 initiates conduction in that device in approximately the middle of each horizontal scanning cycle, causing a linear increase in current in primary winding 52, and hence windings 56 and 57, until a maximum is reached corresponding to the three electron beams of the image reproducer being at the right edge of the raster. At this point the drive signal applied to control grid 43 suddenly becomes negative and drives device 44 sharply into cutoff. The sudden termination of current flow through winding 52 causes the magnetic field surrounding that winding and windings 56 and 57 to collapse, initiating a harmonic oscillation of approximately 95 kHz. in the equivalent tuned circuit consisting of deflection winding 57, capacitors 58 and 59, and the various stray and fixed capacities and inductances of the deflection circuit.

The current through deflection winding 57 reverses during the first quarter cycle of the induced oscillation and rises to a maximum in the reverse direction at the end of the second quarter cycle of oscillation. This rapid reversal of current flow constitutes the flyback or retrace interval during which the scanning beams of image reproducer 15 are rapidly returned from the right edge to the left edge of the raster. The voltage developed across winding 56 as a result of the rapid current reversal is applied to diode 55 through inductor 54 and capacitor 58. During retrace this renders the cathode of diode 55 positive with respect to its anode, so that diode does not conduct and has no damping effect on the oscillation. However, at the end of the first half cycle of oscillation the polarity of the signal applied to diode 55 is reversed and the diode conducts, damping out subsequent oscillations and causing a linearly decaying in deflection winding 57. This sweeps the electron scanning beams from the left edge to the center of the raster, at which point pentode 44 again becomes conductive to complete the scanning cycle.

The sudden termination of current flow at the beginning of each retrace interval also generates a harmonic oscillation in a high voltage tertiary winding 60 contained on transformer 53. This oscillation is peak-rectified by a high voltage rectifier 61 which, in conjunction with the internal capacity of image reproducer 15, develops an accelerating potential of approximately 25,000 volts on the ultor electrode 62 of the image reproducer. A secondary winding 63 is included on transformer 53 for energizing the heater of rectifier 61.

The receiver includes a pulse-controlled high voltage regulator 64, preferably identical to the system claimed and described in the copending application of Stanley Bart, Ser. No. 567,466, now U.S. Pat. No. 3,501,589 issued Mar. 17, 1970, and assigned to the present assignee, for regulating the accelerating potential applied to image reproducer 15. The regulator has a pair of output terminals 65 and 66 shunt-connected across secondary winding 57 of sweep transformer 53, a control terminal 67 connected to the receiver B+ boost source, the juncture of winding 56 and capacitor 58, and a gating terminal 68 connected by a coupling capacitor 69 to a source of burst-interval gating pulses, output terminal 35 of horizontal oscillator 33.

Basically, the regulator functions by variably loading secondary winding 56 during the first quarter cycle of the induced harmonic oscillation, the effect of which is to vary the peak amplitude of the initial quarter cycle of oscillation in tertiary winding 60, and hence the DC voltage developed by rectifier 61. The degree of loading thus imposed is varied directly with the accelerating potential applied to ultor electrode 62 through the agency of an external accelerating-potential-related control voltage applied to terminal 67, in this case the receiver B+ boost voltage, to establish the necessary feedback loop for voltage regulation. To prevent the width of the reproduced image from varying with regulator-imposed loading variations on winding 56, the horizontal-rate signal generated by horizontal oscillator 33 is applied to the gating control terminal 68 of the regulator to gate that stage on only during the small portion of the first half of the retrace interval during which the initial voltage-determining flyback pulse is present, and not during the scanning portions of the cycle.

For regulator 64 to function it is necessary that the circuitry of horizontal deflection stage 34, and in particular pentode 44 and the turns ratios of the various windings of transformer 53, be engineered to produce an accelerating potential on ultor electrode 62 in excess of the desired nominal value in the absence of loading imposed by regulator 64. In practice, this voltage may be in the order of 28,000 to 30,000 volts, substantially in excess of the 25,000 volt desired maximum value. It will be appreciated that absent additional protection circuitry, any failure of the regulator stage 64, whether it be caused by an open heater, a component failure, or an absence of gating pulses, will result in an overvoltage condition.

To prevent this situation from occurring, the receiver includes a voltage-limiting control circuit which detects the overvoltage condition and through the agency of bistable control means in the form of an electronic switch device disables pentode 44 to the extent that the over-voltage condition cannot be sustained. In particular, the control circuit comprises an overvoltage detector in the form of a transistor 70 having its emitter electrode connected to one end terminal of a flyback transformer secondary winding 71, which serves as a source of retrace-interval pulses amplitude-dependent on the accelerating potential applied to image reproducer 15. The base electrode of transistor 70 is positively biased by a voltage divider serially comprising a resistor 72, a thermistor 73 and the parallel combination of a voltage dependent resistor (VDR) 74 and a potentiometer 75. By proper selection of the values of thermistor 73 and VDR 74 of a DC voltage substantially independent of B+ and of temperature variations is maintained at the base, and rheostat-connected potentiometer 75 allows this voltage to be adjusted within certain predetermined limits. A capacitor 76 is connected between the emitter and base electrodes of transistor 70 to provide a controlled amount of cross-coupling between these elements to gain stability and help prevent extraneous noise from triggering the circuit.

It will be appreciated that the emitter-base junction of transistor 70 has an inherent breakdown or threshold potential, and that when the pulse applied to the emitter exceeds the potential existing on the base by virtue of the DC bias and cross-coupled pulse from capacitor 76, that junction will breakdown and cause a positive bias to appear on the transistor's collector electrode. This electrode is coupled to ground by the parallel combination of a capacitor 77 and a resistor 78 which serves to establish a time constant for the circuit, and to the control electrode of a bistable switch device, silicon controlled rectifier (SCR) 79. This rectifier has one of its principal electrodes (cathode) connected to ground and its other electrode (anode) connected by a current-limiting resistor 80 to the screen grid 48 of pentode 44. Thus, when SCR 79 is conductive, grid 48 is effectively shunted to ground by a low impedance current path and receives only a small fraction of its nominal operating current. As a result, the efficiency of pentode 44 is reduced to a point where the output from that tube is no longer sufficient to operate the deflection system in a normal manner and sustain the overvoltage condition.

The value of the series current limiting resistor 80 is sufficient to prevent damage to SCR 79 from excessive current, but small enough so that when SCR 79 is conductive the screen voltage applied to pentode 44 will be reduced to a point where the deflection system can no longer function. To a viewer this condition may be manifested either by no raster, or by severe degradation of the reproduced image in the form of inadequate width, blooming and poor focus, in either case causing the viewer to discontinue operation of the receiver and to summon a serviceman.

Unfortunately, absent additional circuitry, once SCR 79 has been triggered into conduction, it will remain conductive as long as its minimum holding current requirements are met. Thus, for practical SCR devices and practical values of screen dropping resistance, the horizontal deflection system will remain disabled indefinitely following an overvoltage condition, whether continuous or momentary, until B+ current to the screen grid is interrupted, which normally would occur only when the set is deenergized. To prevent this condition from occurring each time the receiver is initially energized and B+ is present on screen grid 48 because that grid is not yet drawing current, it has been heretofore necessary to specify that the breakdown voltage rating between the principal electrodes of the SCR be in excess of the receiver B+ voltage, which has substantially increased the cost of the SCR, and hence the control circuit.

In accordance with the invention, means are included for periodically restoring the SCR to a nonconductive, or ineffective, state. This restoring means comprises a source of negative polarity pulses, and a capacitor 81 coupled between the source, in this instance the juncture of resistors 27 and 29 and the primary winding of transformer 26 in vertical deflection system 22, and the screen grid 48 of pentode 44 in horizontal deflection system 34. Capacitor 81 serves to couple vertical-rate pulses to grid 48 at an amplitude sufficient to momentarily reduce the current flowing through the principal electrodes of SCR 79 below the minimum holding current of that device.

Initially, after SCR 79 is first triggered into conduction by an overvoltage condition, it must discharge capacitor 81 and the other associated capacitances of the horizontal and vertical deflection systems. Because of the low impedance between the principal electrodes of SCR 79 while that device is in a conductive state and the relatively low impedance of series-connected resistor 80, the discharge period is short, in the order of 0.5 second, and after the capacitors have discharged a quiescent current is reached which depends primarily on the size of screen dropping resistor 49 and the receiver B+ supply. Normally this quiescent current would be greater than the minimum holding current of the SCR and therefore would serve to maintain conduction in that device. However, the negative-polarity vertical pulses introduced by capacitor 81 are sufficient to momentarily reduce this quiescent current below the minimum holding current of the SCR, causing conduction through the principal electrodes of the SCR to be terminated. Once this has occurred, capacitors 50 and 81 quickly become charged by the incoming current through resistor 49 and the horizontal deflection system and high voltage power supply are restored to normal operation. Of course, if the overvoltage condition again develops when the high voltage power supply becomes operative, another will be applied to the SCR and the process is repeated. With the illustrated circuit and a sustained overvoltage condition, the repetition rate between alternative operative and inoperative states is approximately 0.5 second, determined by the size of the various resistors and capacitors utilized in the circuit and the receiver B+ voltage. This is evidenced to the viewer as an alternately dark and bright viewing screen, which "blinking" action is more likely to attract attention to the malfunction than would an absent or defocused raster.

The restoring action of the pulses coupled by capacitor 81 is of considerable import to the illustrated control circuit, as it allows the use of a less expensive SCR with a lower breakdown voltage; it being immaterial that the SCR may break down and conduct during warm-up of the receiver since conduction will be interrupted by a pulse from capacitor 81 as soon as the screen voltage on pentode 44 reaches its nominal value. Furthermore, the effect of transients such as may result while changing channels is reduced, inasmuch as the circuit will be almost instantaneously reset following a false actuation.

The proposed circuit requires only a few additional inexpensive components, and therefore is especially well suited for mass production in today's highly competitive consumer television market. Furthermore, the circuit is easy to adjust, offers good stability under conditions of varying line voltage and ambient temperature and can be added to a television chassis with few changes in existing circuitry. It is contemplated that in the majority of cases winding 71 will already exist on the sweep transformer as a convergence winding, requiring no additional expense or redesign of existing circuitry. Furthermore, other circuit locations may be possible for the SCR, such as the cathode circuit of the horizontal sweep tube, and other overvoltage detector circuits may be employed instead of the single transistor voltage and temperature circuit illustrated.

The following are a set of component values for the circuit which have been found to provide satisfactory operation in accordance with the invention. It will be appreciated that these values are given by way of example, and that other values may be substituted therefor without departing from the prinicples of the present invention.

| | |
|---|---|
| R27 470 ohms | C30 10 microfarads, 475 VDC |
| R29 12,000 ohms | C31 30 microfarads, 475 VDC |
| R49 17,000 ohms | C50 0.01 microfarad |
| R72 220,000 ohms | C76 0.01 microfarad |
| R73 Carborendom o55oH–3 | C77 0.1 microfarad |
| R74 Amperex **2322-552-02161** | C81 40 microfarads, **400** VDC |
| R75 3,000 ohms | V24 6HE5 |
| R78 100 ohms | V44 6LB6 |
| R80 100 ohms | TR70 2N3638 SCR79 TIC–47 |

While a particular embodiment of the invention has been shown and described, it will be obvious to those skilled in the art that changes and modifications may be made therein without departing from the invention in its broader aspects, and, therefore, the aim in the appended claims is to cover all such changes and modifications as fall within the true spirit and scope of the invention.

I claim:

1. In a television receiver of the type including an image reproducer requiring an externally applied high voltage accelerating potential, and a high voltage power supply energized by the horizontal output stage of said receiver for supplying said potential, a control circuit for preventing said accelerating potential from exceeding a predetermined maximum value comprising:

means including an over-voltage detector coupled to said horizontal output stage for producing a control voltage in response to said accelerating potential exceeding said predetermined maximum value;

bistable control means including a silicon controlled rectifier having a first principal electrode coupled to said horizontal output stage, a second principal electrode coupled to a reference potential, and a control electrode coupled to said overvoltage detector, said silicon controlled rectifier being actuatable by said control voltage from a nonconductive state to a conductive state and remaining therein until restored, to disable said horizontal output stage when said bistable control means is in said conductive state, thereby interrupting said power supply;

and means coupled to one of said principal electrodes for periodically restoring said silicon controlled rectifier to said nonconductive state by reducing the current through said principal electrodes below the minimum holding current required to maintain said silicon controlled rectifier in its conductive state.

2. A control circuit as described in claim 1 wherein said restoring means comprises a source of periodic pulses and means for applying said pulses to said principal electrodes of said silicon controlled rectifier.

3. A control circuit as described in claim 2 wherein said source of pulses comprises the vertical deflection stage of the receiver, and wherein said means for applying said pulses to said principal electrodes comprises a capacitor.

4. A control circuit as described in claim 3 wherein said horizontal output stage includes an electron-discharge device having a cathode, a control grid, a screen grid and an anode, said silicon controlled rectifier is coupled between said screen grid and ground, and said capacitor is coupled between said vertical deflection stage and said screen grid.